US012563446B2

(12) United States Patent
Wakudkar et al.

(10) Patent No.: US 12,563,446 B2
(45) Date of Patent: Feb. 24, 2026

(54) WEIGHTED LOAD BALANCING FOR MULTI-LINK OPERATION

(71) Applicant: Cisco Technology, Inc., San Jose, CA (US)

(72) Inventors: Sachin D. Wakudkar, St-Sulpice (CH); Jegan Manoharan, Bangalore (IN); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 18/437,074

(22) Filed: Feb. 8, 2024

(65) Prior Publication Data

US 2025/0261041 A1     Aug. 14, 2025

(51) Int. Cl.
| | |
|---|---|
| *H04W 28/086* | (2023.01) |
| *H04W 24/04* | (2009.01) |
| *H04W 24/10* | (2009.01) |
| *H04W 40/24* | (2009.01) |

(52) U.S. Cl.
CPC ......... *H04W 28/086* (2023.05); *H04W 24/04* (2013.01); *H04W 24/10* (2013.01); *H04W 40/24* (2013.01); *H04M 2215/7428* (2013.01)

(58) Field of Classification Search
None
See application file for complete search history.

(56) References Cited

U.S. PATENT DOCUMENTS

| | | | | |
|---|---|---|---|---|
| 10,270,607 B2 * | 4/2019 | Nagaraja | ............. | H04L 12/1886 |
| 11,689,972 B2 * | 6/2023 | Xie | ................. | H04W 36/00698 |
| | | | | 370/331 |
| 2003/0169716 A1 | 9/2003 | Saito | | |
| 2015/0119035 A1 * | 4/2015 | Ganu | ................. | H04W 36/302 |
| | | | | 455/436 |

(Continued)

FOREIGN PATENT DOCUMENTS

| | | | | |
|---|---|---|---|---|
| WO | WO-2017222706 A1 * | 12/2017 | ............ | H04W 72/30 |
| WO | WO-2023154918 A1 * | 8/2023 | ............ | H04W 76/15 |

OTHER PUBLICATIONS

Thubert P., et al., "Reliable and Available Wireless Technologies", Workgroup: RAW, Intended Status: Informational, Jul. 10, 2023, 62 Pages.

*Primary Examiner* — Phyllis A Book
(74) *Attorney, Agent, or Firm* — Patterson + Sheridan, LLP

(57) ABSTRACT

Techniques for weighted load balancing in multi-link operation (MLO) are provided. An announcement message from a second network device is received by a first network device, where the announcement message indicates a presence of the second network device within a network environment. Operational data of the second network device is collected by the first network device by monitoring network signals transmitted by the second network device. An aggregated weight for the second network device is calculated by the first network device based on the collected operational data. A preference value is determined, by the first network device, for the second network device using the aggregated (Continued)

weight. Upon receiving a request from a client device connected to the first network device, a neighbor report is transmitted by the first network device to the client device, where the neighbor report comprises the preference value determined for the second network device.

18 Claims, 7 Drawing Sheets

(56) References Cited

U.S. PATENT DOCUMENTS

| | | | |
|---|---|---|---|
| 2015/0222540 A1* | 8/2015 | Unnimadhavan | H04L 45/74 |
| | | | 709/224 |
| 2016/0192203 A1* | 6/2016 | Gokturk | H04L 41/0823 |
| | | | 370/254 |
| 2017/0272317 A1* | 9/2017 | Singla | H04L 41/0803 |
| 2017/0366956 A1* | 12/2017 | Yoshida | H04L 5/006 |
| 2019/0007842 A1* | 1/2019 | Ganu | H04B 17/318 |
| 2020/0015297 A1* | 1/2020 | Feng | H04W 72/21 |
| 2022/0182897 A1* | 6/2022 | Vivanco | H04W 36/00835 |
| 2022/0337338 A1 | 10/2022 | Homchaudhuri et al. | |
| 2022/0353787 A1* | 11/2022 | Jameson | H04W 40/248 |
| 2023/0262807 A1 | 8/2023 | Jiang et al. | |
| 2023/0308374 A1* | 9/2023 | Wang | H04L 45/48 |
| 2023/0371097 A1* | 11/2023 | Moore | H04L 45/245 |
| 2024/0022502 A1* | 1/2024 | Goyal | H04L 45/42 |
| 2024/0196321 A1* | 6/2024 | Elshafie | H04B 17/336 |
| 2024/0224175 A1* | 7/2024 | Karaki | H04W 28/0221 |
| 2024/0365209 A1* | 10/2024 | Tseng | H04W 40/24 |
| 2025/0142459 A1* | 5/2025 | Patwardhan | H04W 76/15 |
| 2025/0150839 A1* | 5/2025 | Moore | H04B 10/27 |

* cited by examiner

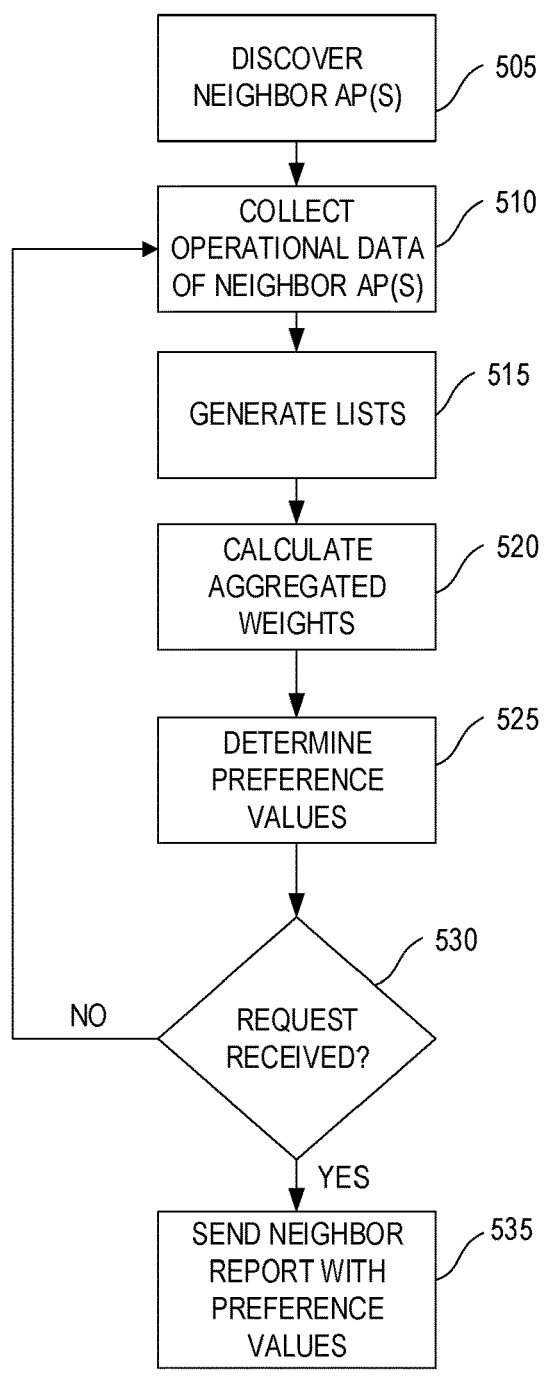
*FIG. 5*

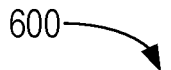

600

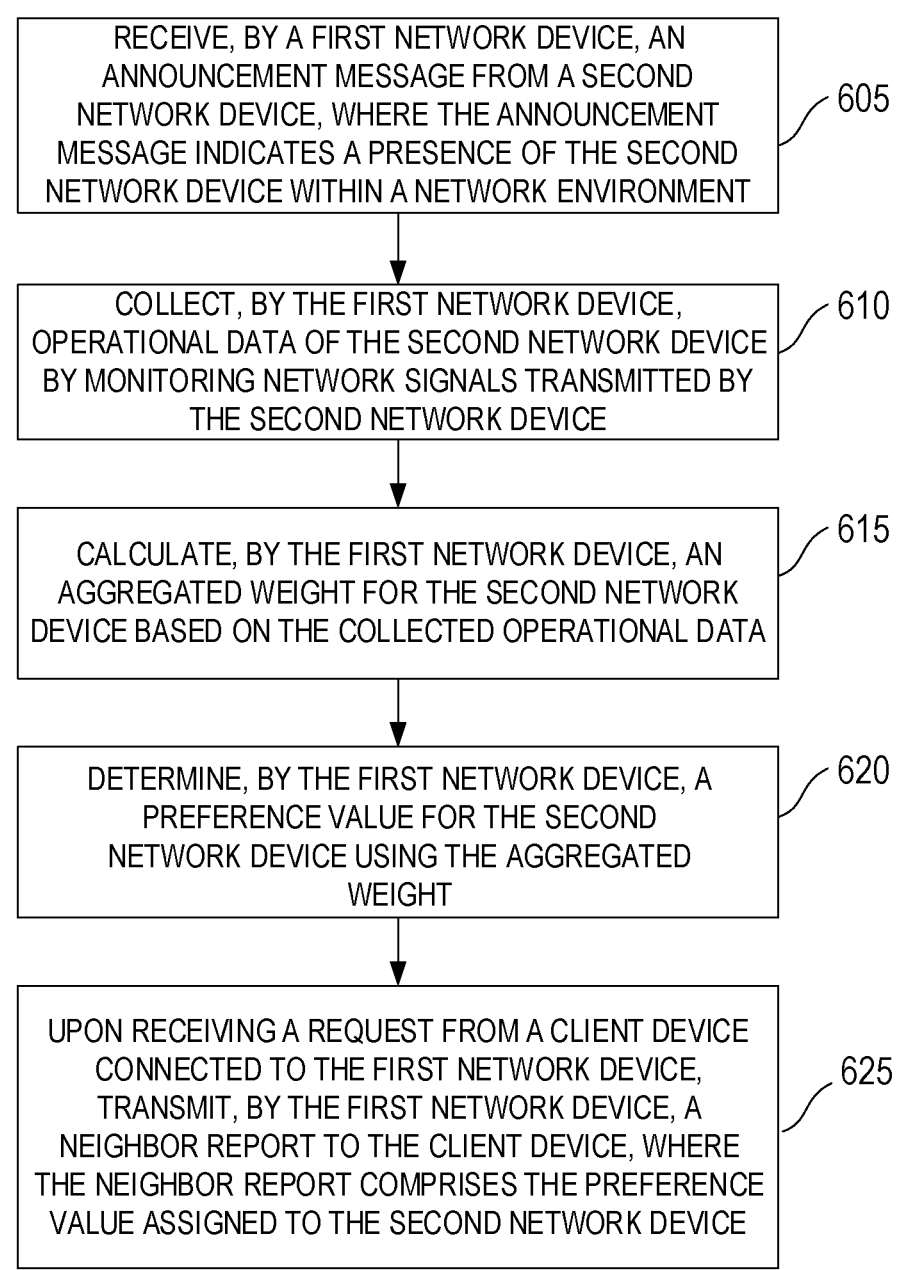

RECEIVE, BY A FIRST NETWORK DEVICE, AN ANNOUNCEMENT MESSAGE FROM A SECOND NETWORK DEVICE, WHERE THE ANNOUNCEMENT MESSAGE INDICATES A PRESENCE OF THE SECOND NETWORK DEVICE WITHIN A NETWORK ENVIRONMENT — 605

COLLECT, BY THE FIRST NETWORK DEVICE, OPERATIONAL DATA OF THE SECOND NETWORK DEVICE BY MONITORING NETWORK SIGNALS TRANSMITTED BY THE SECOND NETWORK DEVICE — 610

CALCULATE, BY THE FIRST NETWORK DEVICE, AN AGGREGATED WEIGHT FOR THE SECOND NETWORK DEVICE BASED ON THE COLLECTED OPERATIONAL DATA — 615

DETERMINE, BY THE FIRST NETWORK DEVICE, A PREFERENCE VALUE FOR THE SECOND NETWORK DEVICE USING THE AGGREGATED WEIGHT — 620

UPON RECEIVING A REQUEST FROM A CLIENT DEVICE CONNECTED TO THE FIRST NETWORK DEVICE, TRANSMIT, BY THE FIRST NETWORK DEVICE, A NEIGHBOR REPORT TO THE CLIENT DEVICE, WHERE THE NEIGHBOR REPORT COMPRISES THE PREFERENCE VALUE ASSIGNED TO THE SECOND NETWORK DEVICE — 625

*FIG. 6*

WEIGHTED LOAD BALANCING FOR MULTI-LINK OPERATION

TECHNICAL FIELD

Embodiments presented in this disclosure generally relate to wireless communication. More specifically, the embodiments disclosed herein relate to weighted load balancing using basic service set (BSS) transition management (BTM) in multi-link operations (MLO).

BACKGROUND

Present BSS transition management (BTM), as defined in 802.11v, is a process that assists devices like smartphones or laptops in smoothly switching between different Wi-Fi access points (APs) within the same network. The primary purpose of the BTM is for load balancing, which aims to distribute network traffic evenly across multiple APs to avoid overloading any single AP. As part of the BTM process, a neighbor report, as defined in the 802.11k, is generated. The report includes a list of preferred Basic Service Set Identifiers (BSSIDs), which helps a device to determine the more suitable or preferable neighboring APs to connect to.

Recent standards introduce multi-link operations (MLO), which enable devices and APs to use multiple links simultaneously for data transmission. The MLO feature can greatly increase the throughput and reliability of the network. However, the integration of MLO into the existing BTM framework poses new challenges. While parameters like the Received Signal Strength Indicator (RSSI) are used to build a preferred BSSID candidate list for roaming, the current standards do not fully accommodate the complexities introduced by MLO. Therefore, the current BTM process may not optimally utilize the capabilities of MLO, leading to less efficient load distribution and network management.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 5 depicts an example method for generating candidate lists of neighboring APs based on aggregated network analysis, according to some embodiments of the present disclosure.

FIG. 6 is a flow diagram depicting an example method for weighted load balancing in MLO, according to some embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
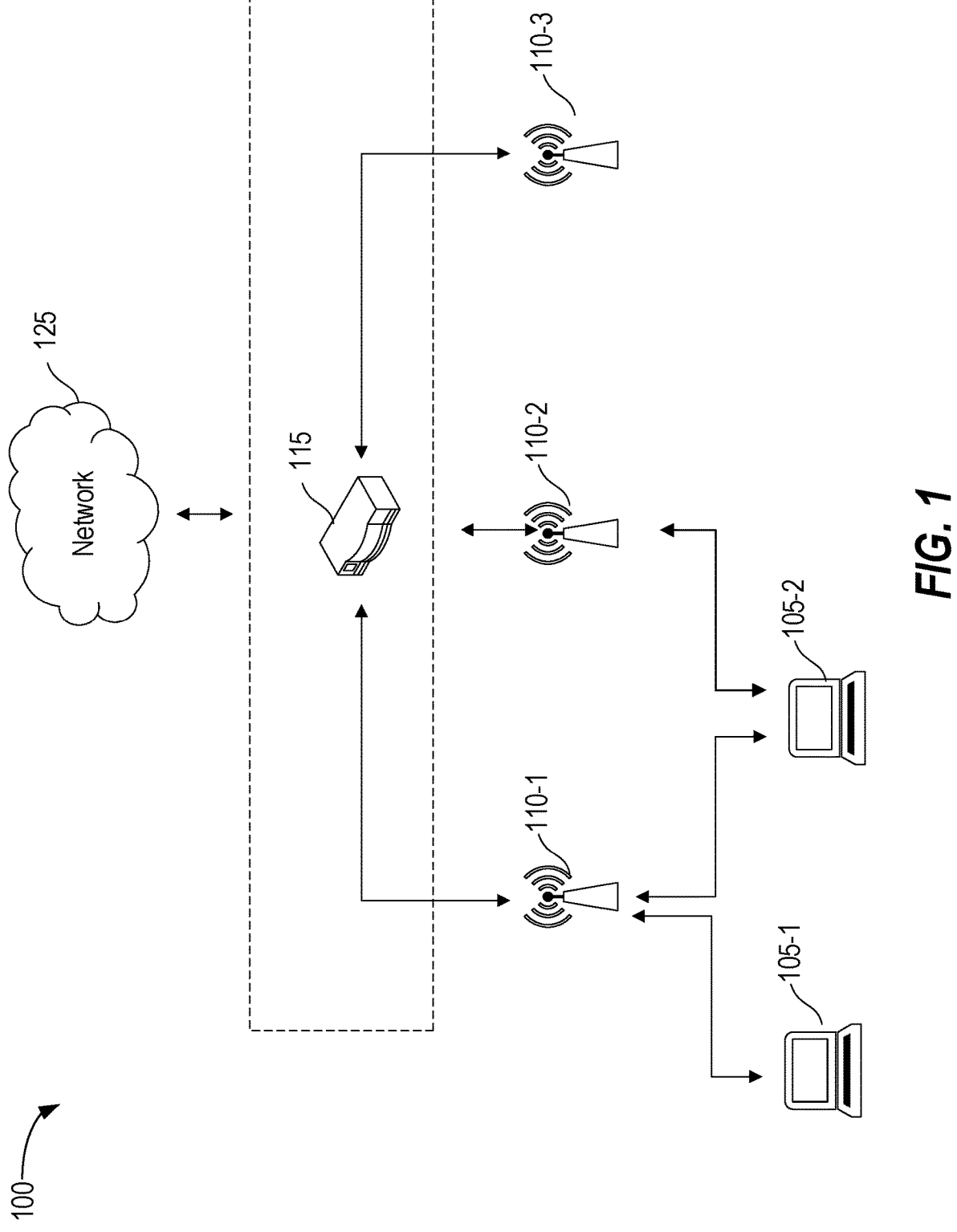
FIG. 1 depicts an example environment that supports weighted load balancing using BTM in MLO, according to some embodiments of the present disclosure.

One embodiment presented in this disclosure provides a method, including receiving, by a first network device, an announcement message from a second network device, where the announcement message indicates a presence of the second network device within a network environment, collecting, by the first network device, operational data of the second network device by monitoring network signals transmitted by the second network device, calculating, by the first network device, an aggregated weight for the second network device based on the collected operational data, determining, by the first network device, a preference value to the second network device using the aggregated weight, and upon receiving a request from a client device connected to the first network device, transmitting, by the first network device, a neighbor report to the client device, where the neighbor report comprises the preference value determined for the second network device.

Other embodiments in this disclosure provide one or more non-transitory computer-readable mediums containing, in any combination, computer program code that, when executed by operation of a computer system, performs operations in accordance with one or more of the above methods, as well as systems comprising one or more computer processors and one or more memories collectively containing one or more programs, which, when executed by the one or more computer processors, perform operations in accordance with one or more of the above methods.

EXAMPLE EMBODIMENTS

The present disclosure provides techniques for weighted load balancing in MLO environments. Embodiments of the present disclosure introduce an approach that integrates the neighboring APs' MLO capacities into the assignment of BSS Transition Candidate Preference values. The assigned BSS preference values for neighboring APs are then included in a neighbor report, and communicated to one or more connected client devices of the AP. The client devices, based on the preference values, prioritize the neighboring APs to decide which one is more preferable or suitable for roaming. By incorporating MLO capacities into the assigned preference values, embodiments of the present disclosure facilitate a more efficient distribution of station (STA) load across multiple APs within an Extended Service Set (ESS), and thereby improve the overall performance of the wireless network.

In some embodiments of the present disclosure, an AP may receive Neighbor Discovery Protocol (NDP) announcements from nearby/neighboring APs. Based on the NDP announcements, the AP may generate a list of neighboring APs and, where applicable, transmit the list to a wireless controller (WLC). Following the detection, the AP may actively collect detailed operational data of the neighboring APs, such as station counts, channel utilization, affiliated link numbers (for ML-enabled APs), bandwidth capabilities, and Signal-to-Noise Ratio (SNR) of signals. In some embodiments, the collection of operational data may be achieved by the AP actively listening for beacon frames broadcasted by these neighboring APs, or capturing probe response frames sent by the neighboring APs to client devices.

In some embodiments of the present disclosure, based on the collected operational data, the AP (or a WLC associated with the AP, where applicable) may then calculate an aggregated weight for each neighboring AP. The aggregated weight reflects each neighboring AP's current operational status and capacity, based on which a preference value may be assigned. In some embodiments, the preference value may be specified as an 8-bit value, and has a range between 1 and 255, as defined within 802.11k. A higher value indicates a more desirable AP for the client device to connect to, with 255 indicating the most preferred candidate AP. Based on these preference values, the client devices associated with the current AP may prioritize the neighboring APs. By selecting APs with higher preference values, client devices can contribute to a more evenly distributed network load and therefore improve the overall network performance.

In some embodiments of the present disclosure, a client device may transmit a BTM request to the AP to which it is currently associated, seeking information about available neighboring APs. Upon receiving the request, the AP may generate a neighbor report. The neighbor report may include an optimized candidate list of neighboring APs, detailing their MLO capabilities and assigned BSS preference values. Based on the information provided in the neighbor report, the client device may then make informed decisions about network selection or roaming to optimize its connectivity.

FIG. 1 depicts an example environment 100 that supports weighted load balancing using BTM in MLO, according to some embodiments of the present disclosure. The illustrated environment 100 comprises a single-link STA 105-1 (e.g., a station or client device that does not support MLO), an ML-enabled STA 105-2 (e.g., a station or client device that supports MLO), an ML-enabled AP 110-1 (e.g., an AP that supports MLO), a single-link AP 110-2 (e.g., an AP that does not support MLO), an AP 110-3 (either ML-enabled or single-link) that is within the signal range of AP 110-1 and 110-2, and a wireless LAN controller (WLC) 115.

In the illustrated environment 100, the ML-enabled STA 105-2 connects to (e.g., is associated to) AP 110-1 and AP 110-2 using two different links. Through the two different communication links, the STA 105-2 may communicate with APs 110-1 and AP 110-2 simultaneously or sequentially. For example, in some embodiments, the STA 105-2 may receive downlink data from the AP 110-1 via the first link, and simultaneously (or non-simultaneously) upload uplink data to the AP 110-2 via the second link. In some embodiments, the STA 105-2 may transmit one type of data (e.g., non-deterministic data) to AP 110-1 via the first link, and simultaneously (or non-simultaneously) transmit another type of data (e.g., deterministic or time-sensitive data) to AP 110-2 via the second link.

In the illustrated environment 100, the AP 110-1 also supports MLO, and connects to STA 105-1 and STA 105-2 using two different links. The AP 110-1 may engage in simultaneous or sequential communication with the two STAs through these links. For example, AP 110-1 may transmit downlink data to STA 105-1 via the first link, while simultaneously (or non-simultaneously) receiving uplink data from STA 105-2 via the second link.

In the illustrated example, APs 110-2 and 110-3 are within the signal range of AP 110-1. As illustrated, the APs 110-2 and 110-3 are part of the same Extended Service Set (ESS) (or network) as AP 110-1 (e.g., operating under the same SSID), and controlled by the same wireless LAN controller (WLC) 115. In such configurations, APs 110-2 and 110-3 may serve as neighboring APs to AP 110-1. STAs that are currently associated with AP 110-1, such as STAs 105-1 and 105-2, may roam to APs 110-2 and 110-3 when load balancing for enhanced network performance is required or desired.

In some embodiments, AP 110-1 may detect the presence of APs 110-2 and 110-3 through NDP announcements sent by these APs. Following the detection, AP 110-1 may generate a list of neighboring APs. In the illustrated example, the list may include APs 110-2 and 110-3, and other APs (not shown) that have made their presence known through NDP announcements.

In the illustrated environment, the WLC 115 manages APs 110-1, 110-2, and 110-3, and connects these APs to a broader network 125 (e.g., the Internet or another local network). In some embodiments, AP 110-1 may send the list of neighboring APs to the WLC 115 for centralized management and coordination in the network.

In some embodiments, following the detection of the neighboring APs, the AP 110-1 may proceed to collect operational data of the neighboring APs 110-2 and 110-3, such as station counts, channel utilization, affiliated link numbers (for ML-enabled APs), bandwidth capabilities, and Signal-to-Noise Ratio (SNR). Based on the collected operational data, in some embodiments, the AP 110-1 (or the WLC 115) may calculate an aggregated weight for each neighboring AP, as discussed in more detail below with reference to FIG. 3. The aggregated weight reflects the overall performance of a neighboring AP, its MLO capacities, and/or its potential channel capability for additional client devices.

In some embodiments, the AP 110-1 (or the WLC 115) may normalize the aggregated weight to a range of 1 to 255 (as defined in standard 802.11k) to generate a corresponding preference value. A higher preference value indicates a more favorable option for client devices considering roaming or load balancing. For example, AP 110-2 may be assigned a preference value of 100, while AP 110-3 may be assigned a preference value of 150. This indicates that AP 110-3, with its higher preference value, has better performance metrics and/or more available channel capacities compared to AP 110-2. In such configurations, when the client device 105-1 connected to AP 110-1 seeks to roam for better connectivity or load balancing, it may consider AP 110-3 as a more optimal choice over AP 110-2 because AP 110-3 has a higher preference value.

In some embodiments, before attempting to roam to another AP, the client device 105-1 may first send a BTM request to AP 110-1, requesting information about available neighboring APs. In response to the BTM request, AP 110-1 may generate a neighbor report (as part of the BTM process). In some embodiment, the report may include a list of the available neighboring APs (including AP 110-2 and 110-3), their MLO capacities, and/or their assigned BSS preference values. Based on the neighbor report, the client device 105-1 may then decide which APs would be more suitable or preferable targets for roaming.

As illustrated, three APs and two of their associated STAs (or client devices) are depicted as parts of an ESS, all under the control of the WLC 115 and connected to network 125. The depicted example is provided for conceptual clarity. In some embodiments, any number of APs and STAs may be managed as parts of an ESS, and load balancing may be performed between the APs to optimize network performance and connectivity.

Figure 2:
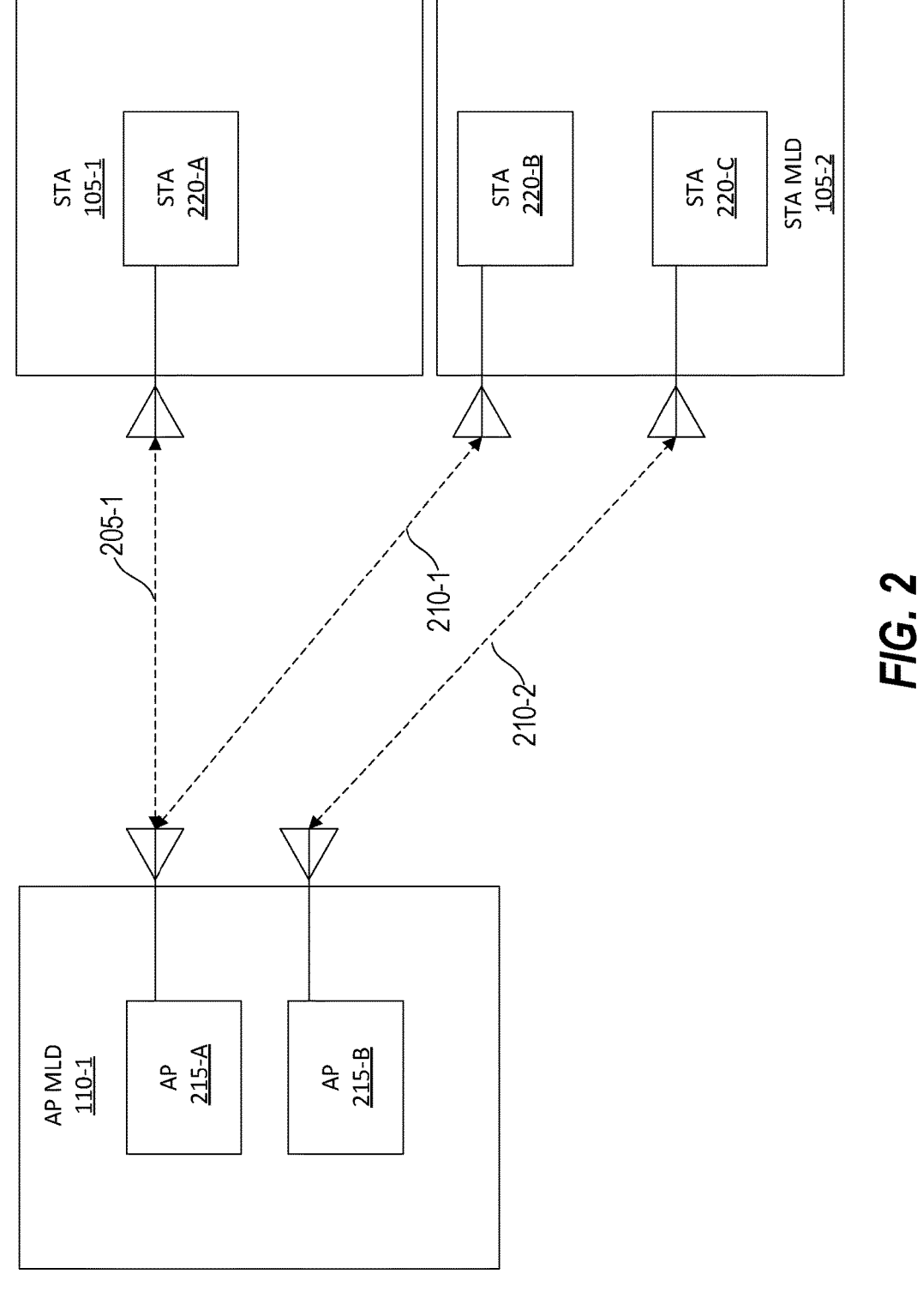
FIG. 2 depicts an example environment for MLO, according to some embodiments of the present disclosure.

FIG. 2 depicts an example environment for MLO, according to some embodiments of the present disclosure. In the illustrated environment 200, the AP 110-1 connects to the STA 105-1 via a link 205, and to the STA 105-2 via a set of links 210.

As illustrated, the AP 110-2 is multi-link capable, and comprises two radio interfaces, AP 215-A and AP 215-B, each having a unique Basic Service Set Identifier (BSSID) for low-level networking (in some embodiments, the AP 110 may be referred to as an AP multi-link device or AP MLD for conceptual clarity, while the APs 215 may be referred to as "AP radios" or "AP interfaces" of the AP device). The STA 105-2 also supports MLO, and comprises two radio interfaces, STA 220-B and STA 220-C. Each interface of the STA 105-2 has a unique Medium Access Control (MAC) address for low-level, hardware-based networking (in some embodiments, the STA 105-2 may be referred to as a STA multi-link device or STA MLD for conceptual clarity, while the STAs 220 may be referred to as "STA radios" or "STA interfaces" of the STA device). Within the two pairs of radio interfaces, STA 220-B connects to AP 215-A via the link 210-1, and STA 220-C connects to AP 215-B via the link 210-2.

In the illustrated example, the STA 105-1 is single-link capable, and thus only has one radio interface STA 220-A. In some embodiments, devices with multiple STAs (e.g., 105-2) may nevertheless operate in single link mode (e.g., due to network conditions, device configuration). Similarly, in some embodiments, devices with a single STA (e.g., 105-1) may operate in MLO mode (e.g., using eMLSR). The interface STA 220-A connects to AP 215-A via the link 205-1. The links 205-1, 210-1 and 210-2 correspond to wireless connections, each having a unique link ID. Through these links 205 and 210, AP 110-1 can effectively communicate with both STAs 105-1 and 105-2, and/or handle data transmission with the two STAs either simultaneously or sequentially.

In some embodiments, each linked AP/STA interface pair may operate using a different frequency, as compared to one or more other AP/STA interface pairs. For example, the link 210-1 between AP 215-A and STA 220-B may use a first frequency band (e.g., 2.4 GHz), while the link 210-2 between AP 215-B and STA 220-C may use a second frequency band (e.g., 5 GHz).

The AP 110-1 and STA 105-2 are generally representative of any device capable of performing multi-link operations. The STA 105-1 is generally representative of any device that is single-link capable (or is otherwise operating in a single-link configuration). As discussed above, in some embodiments, the AP 110-1 may detect the presence of nearby APs (e.g., AP 110-2 and 110-3 of FIG. 1) based on NDP announcements, and/or may actively collect the operational data of these nearby APs to evaluate their performance and capacity to handle additional client devices. In some embodiments, based on the collected data, the AP 110-1 may generate an aggregated weight for each nearby AP, and/or assign a matching preference value (e.g., in a range from 1 to 255). When the STA 105-1 or STA 105-2 seeks roaming opportunities, it may first send a roaming request to the AP 110-1 to which it is currently connected to. In response to the request, the AP 110-1 may provide a neighbor report, which details the available nearby APs, their operational characteristics (e.g., whether the nearby APs are ML-enabled), and/or their assigned BSS preference values. The neighbor report may assist STA 105-1 or STA 105-2 in making decisions about the best possible AP to roam to for optimized network performance.

In the illustrated example, one ML-enabled AP 110-1, one ML-enabled STA 105-2, and one single-link STA 105-1 are depicted. The illustrated environment 200 for MLO is provided for conceptual clarity. In some embodiments, the MLO may be performed between any number of devices, including ML-enabled APs, single-link APs, ML-enabled STAs, and single-link STAs. In the illustrated example, the ML-enabled AP 110-1 is depicted as having two radio interfaces 215-A and 215-B. In some embodiments, the ML-enabled AP 110-1 may use any number of radio interface APs 215 (including one). Similarly, though the ML-enabled STA 105-2 is depicted as having two radio interfaces 220-B and 220-C in the illustrated example, in some embodiments, the ML-enabled STA may have any number of interface STAs 220 (including one).

As illustrated, the interface APs 215 each have one antenna. In some embodiments, each interface AP 215 may have any number of antennas. Similarly, though the interface STAs 220 each have one antenna in the illustrated example, in some embodiments, each interface STA 220 may have any number of antennas.

In some embodiments, ML-enabled AP 110-1 and STA 105-2 may generally be referred to collectively as "MLDs" or "multilink devices," indicating that they are capable of using multiple communication links, whether using one link at a time, or using multiple links in parallel to transmit and/or receive data. Generally, the AP 110-1 corresponds to an access point device that provides connectivity to a local wireless network (e.g., WiFi), while the STAs 105-1 and 105-2 correspond to stations or client devices connected to the local wireless network via the AP 110-1. Additionally, in some embodiments, the APs 215 may be referred to as "AP radios" or "AP interfaces" of the AP device, and the STAs 220 may be referred to as "STA radios" or "STA interfaces" of the STA device.

Figure 3:
FIG. 3 is a diagram depicting a sequence for weighted load balancing, according to some embodiments of the present disclosure.

FIG. 3 is a diagram depicting an example sequence 300 for weighted load balancing, according to some embodiments of the present disclosure.

In the illustrated example, AP 310 is connected to STA 305 via one or more communication links 320. As used herein, "connected" refers to the state in which AP 310 and STA 305 have completed the necessary steps of wireless network association, including authentication and obtaining required network credentials. The established connection indicates that active communication links 320 (e.g., links 205 and 210 of FIG. 2) exist between the AP 310 and STA 305, which enables data transmission between them.

In the illustrated example, as indicated by the arrow 325, AP 310 receives NDP announcements from one or more neighboring APs 315. In some embodiments, the NDP announcements may include various information that allows AP 310 to understand the capabilities and characteristics of neighboring APs 315. For example, the NDP announcement sent by a neighboring AP 315 may include the BSSID of the AP 315, the radio channels the neighboring AP 315 operates on, information about the neighboring AP's supported features (like supported data rates, bandwidth capabilities, beamforming, MLO capabilities, etc.), and other relevant information related to network management and security (like the neighboring AP's configured power levels, beacon intervals, encryption methods, etc.).

In the illustrated example, AP 310 detects the presence of neighboring APs 315 through their NDP announcements, and then generates a list of these APs (as depicted by block 330). In some embodiments, AP 310 may report the list to a wireless controller (e.g., WLC 115 of FIG. 1) for centralized network management. As used herein, "neighboring AP" may refer to any AP that is within the signal range of AP 310, and belongs to the same ESS (or network) as AP 310. The proximity between the AP 310 and the neighboring APs 315 allows for potential wireless communication and/or client device handoff between them, through which network traffic may be redistributed among the APs, and therefore enhances the overall network performance.

In the illustrated example, after detecting the neighboring APs 315, AP 310 proceeds to collect operational data from these APs 315 (as depicted by block 340). The data collection may be achieved through various methods. In some embodiments, AP 310 may actively listen for beacon frames 335 broadcasted by these neighboring APs 315, which provide information about their operational status. Additionally, in some embodiments, AP 310 may capture probe response frames sent by these APs 315 to client devices. The data collected by the AP 310 may show a range of different operational characteristics for each neighboring AP 315. These characteristics may include, but are not limited to, the number of STAs (or client devices) connected to each neighboring AP, the bandwidth that each neighboring AP supports, the Signal-to-Noise Ratio (SNR) of signals each neighboring AP emits, the Quality of Service Basic Service Set (QBSS) channel utilization of each neighboring AP, and the number of affiliated links (if the neighboring AP supports MLO).

For each characteristic (or feature), a specific weight may be assigned. For example, in some embodiments, a SNR weight is assigned to an AP based on the signals it emits. If the SNR of these signals falls within the range of 0 to 10 dB, a weight of 1 may be assigned to the AP. For every increase of 10 dB in SNR, the signal weight may increase by 1 unit, up to the highest range of 110 to 120 dB, which is assigned a weight of 12. The SNR weight is directly proportional to the detected SNR. The correspondence between detected SNR and SNR weight is provided in Table 1. The specific ranges and weights in Table 1 are intended as mere examples provided for conceptual clarity. In some embodiments, any suitable mapping may be used to define a weight based on the detected SNR.

TABLE 1

| SNR (dB) | SNR Weight |
|----------|-----------|
| 0-10 | 1 |
| 11-20 | 2 |
| 21-30 | 3 |
| 31-40 | 4 |
| 41-50 | 5 |
| 51-60 | 6 |
| 61-70 | 7 |
| 71-80 | 8 |
| 81-90 | 9 |
| 91-100 | 10 |
| 101-110 | 11 |
| 111-120 | 12 |

In some embodiments, a width weight is assigned to a neighboring AP based on the bandwidth it supports. For example, an AP supporting 20 MHz bandwidth may be assigned a weight of 1. The wider the bandwidth an AP supports, the higher the weight it receives. For example, an AP supporting 20 MHz bandwidth may receive a weight of 1, an AP supporting 40 MHz bandwidth may receive a weight of 2, and so on, up to an AP supporting 320 MHz, which receives the highest weight of 5. The width weight is directly proportional to the AP's supported bandwidth. The correspondence between supported bandwidth and width weight is provided in Table 2. The specific ranges and weights in Table 2 are intended as mere examples provided for conceptual clarity. In some embodiments, any suitable mapping may be used to define a weight based on the supported bandwidth.

TABLE 2

| Supported Bandwidth (MHz) | Width Weight |
|---------------------------|--------------|
| 20 | 1 |
| 40 | 2 |
| 80 | 3 |
| 160 | 4 |
| 320 | 5 |

In some embodiments, such as when a neighboring AP 315 is multi-link capable, and can connect to client devices via multiple communication links, the number of links that the AP 315 is affiliated with is used to aggregate each link's corresponding SNR weight. For example, suppose an ML-enabled AP 315 has three radio interfaces, such as AP-1, AP-2, and AP-3, each with a unique BSSID for low-level networking. Each interface may connect to a different STA (or client device) with varying SNR values. For example, suppose AP-1 connects to STA-1 via a first link with an SNR of 10 dB (which corresponds to a weight of 1), AP-2 connects to STA-2 via a second link with an SNR of 30 dB (which corresponds to a weight of 3), and AP-3 connects to STA-3 via a third link with an SNR of 50 dB (which corresponds to a weight of 5). In such configurations, the SNR weight for the AP 315 is calculated as the sum of all individual SNR weights from these links: 1+3+5=9. If each of the three links has the same SNR, such as 50 dB, the total SNR for the AP 315 may be computed by multiplying the individual SNR weight (5) with the number of links (3), resulting in a total SNR weight of 15 (5×3). In some embodiments, if the neighboring AP 315 does not support MLO, the number of affiliated links is considered to be 1. In such configurations, the SNR weight for AP 315 is equal to the individual SNR weight for its signal link. For example, if AP 315 has a single connection with an SNR of 30 dB, its individual SNR weight is 3. Since there is only one link, the total SNR weight for AP 315 remains 3.

In some embodiments, the BSS channel utilization for each neighboring AP may be calculated as the ratio of the busy time to the total time. As used herein, the channel busy time may refer to the time the channel is actively being used for transmission, and the total time may refer to the time of the observation period. In some embodiments, the total time for observation may be calculated by multiplying the beacon interval by the beacon period (and/or then by 1024 to convert the result into microseconds or other proper time units). As used herein, the beacon interval may refer to the time interval between two consecutive beacons sent by the AP. In some embodiments, the beacon interval may be set in Time Units (TUs), where 1 TU is equal to 1024 microseconds. As used herein, the beacon period may refer to the number of beacon intervals observed. For example, if the beacon interval is set to 3 TUs, and three such intervals are observed, the calculation of the total observation time will be: Total Time=3 (TUs)×3×1024 (microseconds). The equation for calculating the QBSS channel utilization for an AP is provided as follows:

$$\text{Channel Utilization} = \left( \frac{\text{Channel Busy Time}}{\text{Beacon Interval} \times \text{Beacon Period} \times 1024} \right) \times 100\%$$

This specific equation is intended as a mere example provided for conceptual clarity. In some embodiments, any suitable function/equation may be used for calculating the QBSS channel utilization for an AP.

In some embodiments, channel utilization (CU) weight is assigned based on the calculated CU percentage. For example, if the AP's CU percentage falls within the range of 0 to 10%, the AP 315 may be assigned a CU weight of 1. For every 10% increase in the CU percentage, the CU weight assigned to the AP may increase by 1. The increment continues until the maximum CU weight of 10 is reached. The CU weight is directly proportional to the detected CU percentage. The correspondence between CU and CU weight is provided in Table 3. The specific ranges and weights in Table 3 are intended as mere examples provided for conceptual clarity. In some embodiments, any suitable mapping may be used to define a weight based on the channel utilization.

TABLE 3

| Channel Utilization (%) | Channel Utilization Weight |
|---|---|
| 0-10% | 1 |
| 11-20% | 2 |
| 21-30% | 3 |
| 31-40% | 4 |
| 41-50% | 5 |
| 51-60% | 6 |
| 61-70% | 7 |
| 71-80% | 8 |
| 81-90% | 9 |
| 91-100% | 10 |

In some embodiments, a weight of station count may be assigned based on the number of client devices that an AP 315 is currently connected or associated to. The STA count weight is inversely proportional to the number of associated devices. This is because a high number of connected devices may indicate that the AP is already heavily occupied, and therefore may not have sufficient capacity to serve additional client devices. The station count weight may be calculated using the following equation, where "n" represents the number of client devices currently connected to the AP. The specific equation below is intended as a mere example provided for conceptual clarity. In some embodiments, any suitable mapping function/equation may be used to define a weight based on the station count.

$$\text{Station Count Weight} = \frac{100}{(n+1)}$$

An AP 315 with no connected client device (e.g., n=0) receives the maximum weight of 100, indicating it has full capacity to take on new client devices. If the neighboring AP 315 is multi-link enabled, the station count weight for the AP 315 may be the sum of the station count weights for each individual link. If each link has the same number of connected devices, the total station count weight for the AP 315 may be the individual station count weight multiplied by the number of links.

In the illustrated example, based on the determined individual weights (e.g., including SNR weight, width weight, QBSS CU weight, and station count weight) and the number of links (if the AP is ML-enabled) (also referred to in some embodiments as link count), the AP 310 (or a WLC) calculates an aggregated weight for each neighboring AP 315 (as depicted by block 345). For example, the equation for calculating an aggregated weight for an AP may be provided as follows:

Aggregated Weight=(SNR Weight×Link Count)+
    (QBSS CU weight×Width Weight)+(Station
    Count Weight×Link Count)

In some embodiments, based on the aggregated weight calculated for each neighboring AP (which may exceed the maximum limit of 255), the AP 310 may apply a normalization function to the aggregate weight. The normalization process ensures that the resulting preference value for each neighboring AP 315 falls within the desired range (e.g., from 1 to 255), such as defined in the 802.11k standard. A neighboring AP with a higher preference value indicates that it supports a wider bandwidth, currently connects to fewer client devices, and/or possesses better signal quality or performance. Therefore, a higher preference value assigned to a neighboring AP suggests that it is a more favorable option for client devices when considering roaming or load balancing.

In some embodiments, an AP with MLO capabilities (e.g., an ML-enabled AP) (e.g., AP 110-1 of FIG. 1) may be assigned a higher preference value compared to a single-link AP (e.g., AP 110-2 of FIG. 1), assuming all other metrics such as SNR, station count, and supported bandwidth are the same. This is because ML-enabled APs can offer enhanced performance and reliability by managing multiple simultaneous connections. The capacity of ML-enabled APs to efficiently handle increased network traffic makes them a better choice for STAs (or client devices) when considering roaming or load balancing, which therefore justifies a higher preference value. By combining the MLO features into the decision of BSS preference values, AP 310 may provide its associated client device 305 a more comprehensive representation of each neighboring AP's current status and capabilities for serving additional client devices. The enhanced representation may allow the client device 305 to make more informed choices regarding when and where to roam.

In some embodiments, the STA 305 may consider roaming to a different AP when it experiences poor performance due to high congestion on its current AP, or detects that the signal strength from its current AP is weakening. Before making the roaming decision, as illustrated, the STA 305 first sends a neighbor report request 350 to the AP 310, asking information about available neighboring APs. The AP 310, upon receiving the request 350, generates a neighbor report and sends it as a response 355 to the STA 305. The neighbor report may list all available neighboring APs, their MLO capabilities (e.g., whether they are ML-enabled or single-link), and their determined BSS preference values (based on the aggregated weights). The STA 305 can then use the provided BSS preference values and/or MLO capability information to select an AP that is better suited to provide the required quality of service.

In some embodiments, instead of including a candidate list specific to each neighboring AP as a whole, the neighbor report provided to a single-link STA (e.g., 105-1 of FIG. 1) may present a list specific to each radio interface of the neighboring APs, along with the BSS preference value for each interface. For example, if the neighboring AP 315 supports MLO and includes two radio interfaces, AP-1 and AP-2, each with a unique BSSID, the aggregated weight for each AP interface (e.g., AP-1 or AP-2) may be calculated as follows:

$$\text{Aggregated Weights for An } AP \text{ Interface} = SNR \text{ Weight} \times 1 +$$

$$(QBSS\ CU \text{ Weight} \times \text{Width Weight}) + (\text{Station Count Weight} \times 1)$$

A BSS preference value may then be determined for each radio interface based on the calculated aggregated weight. This approach is more relevant for single-link STA 305, as it accurately reflects the capabilities and current load of each individual interface, rather than the combined capacities of an ML-enabled AP, which a single-link STA cannot fully utilize.

Figure 4:
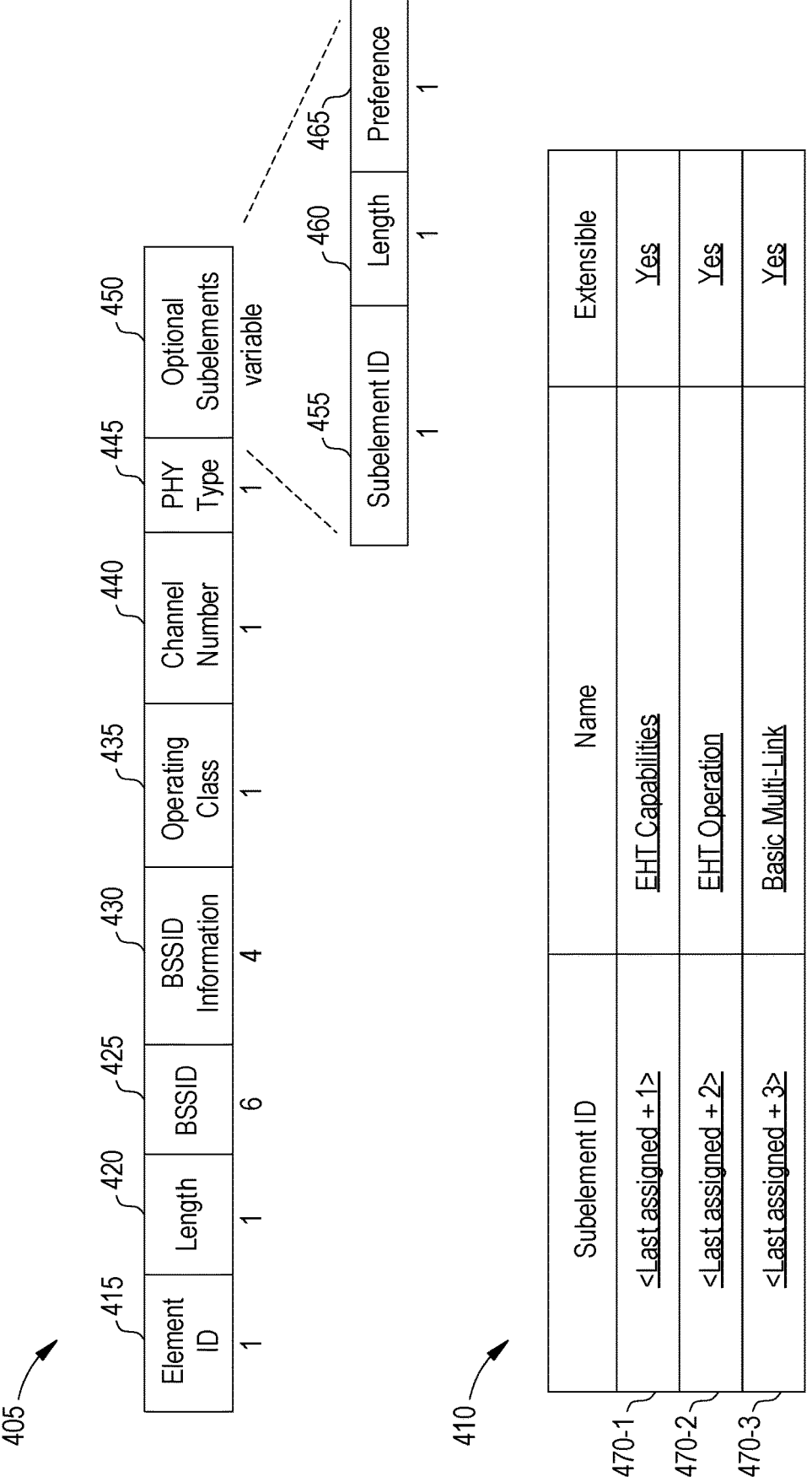
FIG. 4 depicts an example neighbor report element and example subelement identifiers (IDs), according to some embodiments of the present disclosure.

FIG. 4 depicts an example neighbor report element 405 and example subelement identifiers (IDs) 470, according to some embodiments of the present disclosure.

In the illustration, table 405 presents the format of a neighbor report element that include 8 fields: Element ID 415, Length 420, BSSID 425, BSSID Information 430, Operating Class 435, Channel Number 440, PHY Type 445, and Optional Subelements 450. The Optional Subelements fields can further include subfields, including Subelement ID 455, Length 460, and Preference 465. The Subelement ID field 455 includes values used to indicate an AP's MLO capabilities. The Preference field 465 contains BSS preference values assigned to the AP, representing its desirability for client devices that are considering roaming. As discussed above, in some embodiments, the BSS preference value may be calculated based on the AP's aggregated weight derived from its various operational metrics.

In the illustration, table 410 lists additional subelement IDs that can be included within the Optional Subelements field 450. Each subelement ID corresponds to a specific feature or capability of an AP. For example, the "last assigned ID plus one" 470-1 is assigned to indicate the AP has Extremely High Throughout (EHT) capabilities, the "last assigned ID plus two" 470-2 is assigned to indicate that the AP supports for EHT operation, and the "last assigned ID plus three" 470-3 is assigned to indicate that the AP supports MLO. As used herein, the "last assigned" refer to the sequence of identifiers that have been previously defined to indicate specific capabilities or functions. New capabilities are then assigned the next numerical values following this sequence. For example, if 50 subelement IDs have been assigned to indicate various capabilities, and to indicate new capabilities, 51 may be assigned for EHT capabilities, 52 may be assigned for EHT Operation, and 53 may be assigned for Basic Multi-Link.

When a client device (e.g., 305 of FIG. 3) receives the example neighbor report 405, through the assigned subelement IDs, it can correctly recognize the supported capabilities of each neighboring AP listed in the report. Additionally, through the BSS preference values provided for each neighboring AP (within the Preference subfield), the client device can prioritize these neighboring APs for potential roaming, and select the more suitable APs to connect to for optimizing the overall network performance.

FIG. 5 depicts an example method 500 for generating candidate lists of neighboring APs based on aggregated network analysis, according to some embodiments of the present disclosure. In some embodiments, the method 500 may be performed by an AP (either ML-enabled or single-link), such as the APs 110 of FIGS. 1 and 2, and the AP 310 of FIG. 3, and/or a WLC, such as the WLC 115 of FIG. 1.

The method 500 begins at block 505, where an AP (or a WLC) discovers neighboring APs within its signal range. The AP may use specific protocols designed for neighbor discovery, such as NDP in Wi-Fi networks. The AP may actively listen to the announcements from nearby APs. Based on the received announcements, the AP may generate an initial list of neighboring APs. The list may include basic information about each neighboring AP, such as their BSSIDs or the channels they are operating on. In some embodiments, the discovery process may be a continuous activity, where the AP may continuously monitor its nearby network environment, and/or update the initial list to reflect any changes it detects, such as when new APs enter the range or existing APs go offline.

At block 510, the AP (or the WLC) actively collects operational data that reflects the current states and capabilities of the neighboring APs. The operational data may include, but is not limited to, metrics such as signal strength (e.g., RSSI or SNR), channel utilization, the number of connected client devices, the number of affiliated links (if the neighboring AP is ML-enabled), and supported bandwidth. The data collection may be accomplished by actively listening to beacon frames broadcasted by neighboring APs. In some embodiments, the beacon frames may include information about the AP's identification (e.g., BSSID), supported frequencies, and network standards. In some embodiments, the AP may capture probe response frames sent by these neighboring APs in response to the client devices' requests. These frames may provide additional information, such as each AP's current load and other performance metrics. In some embodiments, the AP may measure the signal strength (e.g., RSSI) of these beacon frames and/or probe response frames. In some embodiments, by analyzing the beacon frames and/or probe response frames, the AP may extract details related to station count (e.g., the number of client devices connected to each neighboring AP), and/or determine the channel utilization of each neighboring AP.

At block 515, the AP (or the WLC) generates a list of neighboring APs (or complies the initial list) based on the operational data collected at block 510. In some embodiments, the list generated by the AP may represent the current status and capabilities of each neighboring AP as a whole. For a neighboring AP that is ML-enabled, the BSS preference value provided in the list for the AP is determined by aggregating the capabilities of all its associated links. The BSS preference value reflects the combined operational characteristics of each link associated with the ML-enabled AP, and provides a comprehensive overview of its overall capacity and performance. This type of list may be beneficial for ML-enabled STAs because these devices can join multiple links simultaneously.

In some embodiments, the list generated by the AP may be tailored specifically to each radio interface of the neighboring APs. Every radio interface, identified by its unique BSSID, may be evaluated and listed individually. Such a list may be more relevant for single-link STAs, as these STAs are capable of joining one link at a time. This type of list accurately reflects the capabilities and current load of each individual interface (which are relevant to single-link STAs) rather than the combined capabilities of an ML-enabled AP. In some embodiments, the AP (or the WLC) may prepare different lists (either a per AP list or a per BSSID list) for different types of client devices in the network. For example, the AP may prepare a per-AP candidate list for ML-enabled STAs, as these STAs may benefit from seeing the combined capabilities of APs with multiple interfaces. The AP may prepare a per-BSSID candidate list for single-link STAs, as these devices require a more granular view focused on individual interfaces.

At block 520, the AP (or the WLC) calculates aggregated weights for each neighboring AP (or their individual radio interfaces) based on the operational data collected at block 505, including but not limited to SNR (or RSSI), channel utilization (CU), supported bandwidth, the number of connected client devices, and the number of affiliated links (where MLO is applicable). As mentioned above, each type of operational data is quantified and assigned a specific weight, such as SNR weight, QBSS CU weight, station count weight, and supported bandwidth weight. For example, higher SNR may be given more weight as it indicates better communication quality, whereas higher utilization may be assigned less weight since it implies potential congestion. The weights assigned to individual operational characteristics are then combined to form an aggregated weight for each AP (or each of its radio interfaces). The aggregated weight reflects the performance and capacity of the AP (or one of its radio interfaces). An AP with a higher aggregated weight indicates it has better performance and more available capacity to handle additional client devices.

At block 525, based on the aggregated weights, the AP (or the WLC) determines a BSS preference value to each neighboring AP (or each of its radio interface). The determination may involve apply a normalization function to the aggregated weights (which may exceed the maximum limit of 255), in order to scale these weights within the standard range of 1 to 255 (as defined in 802.11k). The resulting BSS preference values may guide client devices in making informed decisions about potential roaming targets.

At block 530, the AP (or the WLC) checks for any requests (e.g., 350 of FIG. 3) from its associated client devices that ask for neighbor reports. If the request is received, the method 500 proceeds to block 535, where the AP responds by sending the neighbor report to the client device. In some aspects, the report may include a list of neighboring APs (or radio interfaces), with their respective BSS preference values. The report may assist the client device in deciding whether to roam next for optimized connectivity. If no request is received, the method 500 returns to block 510, where the AP continues to monitor the operational status of each neighboring AP. The ongoing monitoring process may involve actively listening to beacon frames and capturing probe responses to keep track of any changes in signal strength (e.g., RSSI, SNR), channel utilization, client load, and other operational parameters of neighboring APs.

FIG. 6 is a flow diagram depicting an example method 600 for weighted load balancing in MLO, according to some embodiments of the present disclosure.

At block 605, a first network device (e.g., the AP 110-1 of FIGS. 1 and 2, the WLC 115 of FIG. 1, the AP 310 of FIG. 3) receives an announcement message from a second network device (e.g., the APs 110-2 or 110-3 of FIG. 1, the AP 315 of FIG. 3), where the announcement message indicates a presence of the second network device within a network environment. In some embodiments, the first network device may comprise at least one of an access point (AP) or a wireless controller. In some embodiments, the second network device may comprise an access point (AP).

At block 610, the first network device (e.g., AP 310 of FIG. 3) collects operational data of the second network device (e.g., AP 315 of FIG. 3) by monitoring network signals transmitted by the second network device. In some embodiments, the network signals transmitted by the second network device may comprise at least one of: (i) a beacon frame broadcasted by the second network device; or (ii) a probe response frame sent by the second network device in response to one or more probe requests. In some embodiments, the operational data of the second network device may comprise at least one of: (i) a number of client devices connected to the second network device, (ii) metrics related to a channel utilization of the second network device; (iii) a number of network links associated with the second network device when the second network device supports Multi-Link Operation (MLO); (iv) a bandwidth supported by the second network device; or (v) Signal-to-Noise (SNR) of the network signals transmitted by the second network device.

At block 615, the first network device (e.g., AP 310 of FIG. 3) calculates an aggregated weight for the second network device (e.g., AP 315 of FIG. 3) based on the collected operational data.

At block 620, the first network device (e.g., AP 310 of FIG. 3) determines a preference value for the second network device (e.g., AP 315 of FIG. 3) using the aggregated weight.

At block 625, upon receiving a request (e.g., 350 of FIG. 3) from a client device (e.g., STA 105-1 or STA 105-2 of FIGS. 1 and 2, STA 305 of FIG. 3) connected to the first network device, the first network device (e.g., AP 310 of FIG. 3) transmits a neighbor report (e.g., 355 of FIG. 3) to the client device, where the neighbor report comprises the preference value determined for the second network device. In some embodiments, the neighbor report may further comprise information related to a capability of the second network device for Multi-Link Operation (MLO).

In some embodiments, the client device (e.g., 305 of FIG. 3), by analyzing the neighbor report (e.g., 355 of FIG. 3), may decide on an action to optimize network connectivity of the client device. In some embodiments, the action to optimize network connectivity of the client device may comprise at least one of: (i) staying connected to the first network device; (ii) initiating connections with both the first and second network devices if the client device supports Multi-Link Operation (MLO); or (iii) roaming to the second network device.

Figure 7:
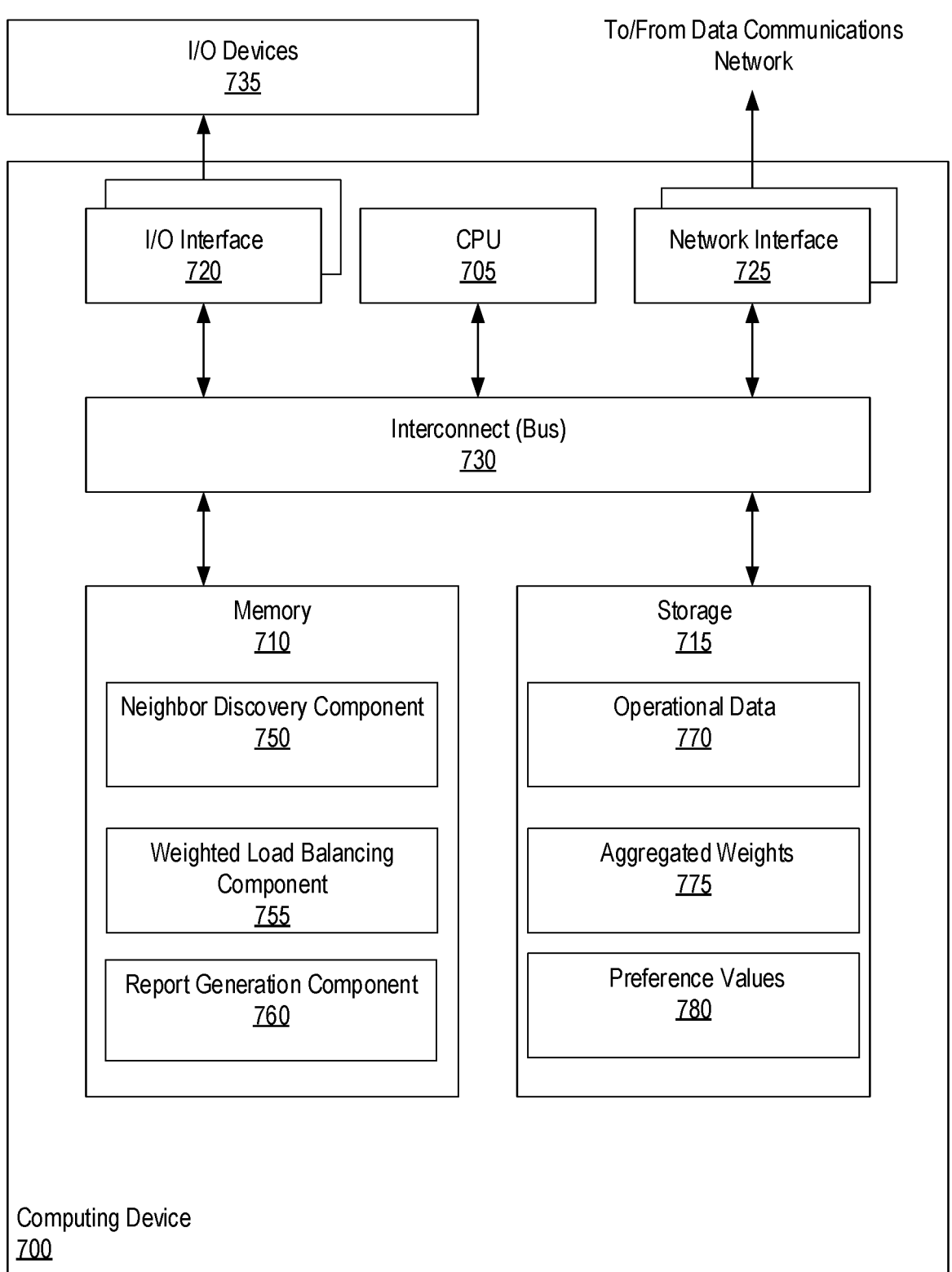
FIG. 7 depicts an example computing device configured to perform various aspects of the present disclosure, according to one embodiment.

FIG. 7 depicts an example computing device 700 configured to perform various aspects of the present disclosure, according to one embodiment. Although depicted as a physical device, in embodiments, the computing device 700 may be implemented using virtual device(s), and/or across a number of devices (e.g., in a cloud environment). In one embodiment, the computing device 700 may correspond to an AP, such as the APs 110-1, 110-2, or 110-3 of FIG. 1, the AP 110-1 of FIG. 2, or the AP 310 of FIG. 3. In one embodiment, the computing device 700 may correspond to a WLC, such as the WLC 115 of FIG. 1.

As illustrated, the computing device 700 includes a CPU 705, memory 710, storage 715, one or more network interfaces 725, and one or more I/O interfaces 720. In the illustrated computing device, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 7155 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some aspects, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730. In some embodiments, the computing device 700 may include one or more antennas and one or more RF transceivers.

In the illustrated computing device, the memory 710 includes a neighbor discovery component 750, a weighted load balancing component 755 and a report generation component 760. Although depicted as a discrete component for conceptual clarity, in some aspects, the operations of the depicted component (and others not illustrated) may be combined or distributed across any number of components. Further, although depicted as software residing in memory 710, in some aspects, the operations of the depicted components (and others not illustrated) may be implemented using hardware, software, or a combination of hardware and software.

In one embodiment, the neighbor discovery component 750 receives NDP announcements from other APs, and generates a list of neighboring APs. The neighbor discovery component 750 maintains an updated record of neighboring APs, and ensures the computing device 700 is aware of its immediate network environment. In some embodiments, the neighbor discovery component 750 may report the neighbor AP list to a WLC for centralized management and coordination in the network.

In one embodiment, the weighted load balancing component 755 monitors the wireless channels, and collects the operational data of these neighboring APs to evaluate their performance and capacities to handle additional client devices. Based on the operational data, the weighted load balancing component 755 then calculates an aggregated weight for each neighboring AP, and assigns a corresponding preference value.

In one embodiment, the report generation component 760 generates a neighbor report for connected client devices (e.g., 105-1 of FIG. 1) upon request. The report may include a list of neighboring APs (or radio interfaces), their MLO capabilities, and assigned preference values. The report is then communicated to the client devices. The preference values and the indication of the neighboring AP's capabilities for MLO may guide client devices in prioritizing the neighboring APs, and identifying which neighboring AP is more suitable or preferable for roaming. By selecting APs with higher preference values for roaming, client devices may optimize the network by distributing the load more evenly across all available APs. This approach may effectively prevent overloading any single AP, and therefore reduce the likelihood of network congestion. Additionally, APs with higher preference values indicate the APs have better operational conditions, such as stronger signal strength, lower client density, and/or higher bandwidth capacities. Therefore, roaming to these APs may also improve the individual connectivity of each client device.

In the illustrated example, the storage 715 includes operational data 770 collected for the neighboring APs, their aggregated weights 775, and assigned preference values

780. Although depicted as residing in storage 715, the operational data 770, the aggregated weights 775, and preference values 780 may be stored in any suitable location, such as a remote database.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:

receiving, by a first access point (AP) or a wireless controller, an announcement message from a second AP, wherein the announcement message indicates a presence of the second AP within a network environment;

collecting, by the first AP or the wireless controller, operational data of the second AP by monitoring network signals transmitted by the second AP;

calculating, by the first AP or the wireless controller, an aggregated weight for the second AP based on the collected operational data; determining, by the first AP or the wireless controller, a preference value for the second AP using the aggregated weight, the preference value representing a load balancing suitability of the second AP to other neighboring APs; and upon receiving a request from a client device connected to the first AP, transmitting, by the first AP or the wireless controller, a neighbor report to the client device, wherein the neighbor report comprises the preference value determined for the second AP.

2. The method of claim 1, wherein the neighbor report further comprises information related to a capability of the second AP for Multi-Link Operation (MLO).

3. The method of claim 1, wherein the operational data of the second AP comprises at least one of:

a number of client devices connected to the second AP;

metrics related to a channel utilization of the second AP;

a number of network links associated with the second AP when the second AP supports Multi-Link Operation (MLO);

a bandwidth supported by the second AP; or

Signal-to-Noise (SNR) of the network signals transmitted by the second AP.

4. The method of claim 1, wherein the network signals transmitted by the second AP comprise at least one of:

a beacon frame broadcasted by the second AP; or a probe response frame sent by the second AP in response to one or more probe requests.

5. The method of claim 1, wherein the client device, by analyzing the neighbor report, decides on an action to optimize network connectivity of the client device.

6. The method of claim 5, wherein the action to optimize network connectivity of the client device comprises at least one of:

staying connected to the first AP;

initiating connections with both the first and second APs if the client device supports Multi-Link Operation (MLO); or roaming to the second AP.

7. A system comprising:

one or more computer processors; and one or more memories collectively containing one or more programs, which, when executed by the one or more computer processors, perform operations, the operations comprising:

receiving, by a first access point (AP) or a wireless controller, an announcement message from a second AP, wherein the announcement message indicates a presence of the second AP within a network environment;

collecting, by the first AP or the wireless controller, operational data of the second AP by monitoring network signals transmitted by the second AP;

calculating, by the first AP or the wireless controller, an aggregated weight for the second AP based on the collected operational data;

determining, by the first AP or the wireless controller, a preference value for the second AP using the aggregated weight, the preference value representing a load balancing suitability of the second AP to other neighboring APs; and upon receiving a request from a client device connected to the first AP, transmitting, by the first AP or the wireless controller, a neighbor report to the client device, wherein the neighbor report comprises the preference value determined for the second AP.

8. The system of claim 7, wherein the neighbor report further comprises information related to a capability of the second AP for Multi-Link Operation (MLO).

9. The system of claim 7, wherein the operational data of the second AP comprises at least one of:

a number of client devices connected to the second AP;

metrics related to a channel utilization of the second AP;

a number of network links associated with the second AP when the second AP supports Multi-Link Operation (MLO);

a bandwidth supported by the second AP; or

Signal-to-Noise (SNR) of the network signals transmitted by the second AP.

10. The system of claim 7, wherein the network signals transmitted by the second AP comprise at least one of:

a beacon frame broadcasted by the second AP; or a probe response frame sent by the second AP in response to one or more probe requests.

11. The system of claim 7, wherein the client device decides on an action to optimize network connectivity of the client device by analyzing the neighbor report.

12. The system of claim 11, wherein the action to optimize network connectivity of the client device comprises at least one of:

staying connected to the first AP;

initiating connections with both the first and second APs if the client device supports Multi-Link Operation (MLO); or roaming to the second AP.

13. One or more non-transitory computer-readable media containing, in any combination, computer program code that, when executed by operation of a computer system, performs operations comprising:

receiving, by a first access point (AP) or a wireless controller, an announcement message from a second AP, wherein the announcement message indicates a presence of the second AP within a network environment;

collecting, by the first AP or the wireless controller, operational data of the second AP by monitoring network signals transmitted by the second AP;

calculating, by the first AP or the wireless controller, an aggregated weight for the second AP based on the collected operational data;

determining, by the first AP or the wireless controller, a preference value for the second AP using the aggregated weight, the preference value representing a load balancing suitability of the second AP to other neighboring APs; and upon receiving a request from a client device connected to the first AP, transmitting, by the first AP or the wireless controller, a neighbor report to the client device, wherein the neighbor report comprises the preference value determined for the second AP.

14. The one or more non-transitory computer-readable media of claim 13, wherein the neighbor report further comprises information related to a capability of the second AP for Multi-Link Operation (MLO).

15. The one or more non-transitory computer-readable media of claim 13, wherein the operational data of the second AP comprises at least one of:

a number of client devices connected to the second AP;

metrics related to a channel utilization of the second AP;

a number of network links associated with the second AP when the second AP supports Multi-Link Operation (MLO);

a bandwidth supported by the second AP; or

Signal-to-Noise (SNR) of the network signals transmitted by the second AP.

16. The method of claim 1, wherein calculating the aggregated weight for the second AP comprises:

calculating a signal-to-noise (SNR) weight, a bandwidth weight, a channel utilization (CU) weight, and a station count weight for the second AP, and combining the calculated weights into the aggregated weight by multiplying each of the calculated weights by a number of links supported by the second AP.

17. The system of claim 7, wherein calculating the aggregated weight for the second AP comprises:

calculating a signal-to-noise (SNR) weight, a bandwidth weight, a channel utilization (CU) weight, and a station count weight for the second AP, and combining the calculated weights into the aggregated weight by multiplying each of the calculated weights by a number of links supported by the second AP.

18. The one or more non-transitory computer-readable media of claim 13, wherein calculating the aggregated weight for the second AP comprises:

calculating a signal-to-noise (SNR) weight, a bandwidth weight, a channel utilization (CU) weight, and a station count weight for the second AP, and combining the calculated weights into the aggregated weight by multiplying each of the calculated weights by a number of links supported by the second AP.

* * * * *